(12) United States Patent
Lee et al.

(10) Patent No.: US 8,442,143 B2
(45) Date of Patent: May 14, 2013

(54) FEEDBACK METHOD AND APPARATUS FOR MULTIPLE BASE STATIONS IN A WIRELESS COMMUNICATION SYSTEM SUPPORTING SINGLE BASE STATION MIMO COMMUNICATION AND MULTIPLE BASE STATIONS MIMO COMMUNICATION

(75) Inventors: Wook Bong Lee, Anyang-si (KR); Jin Young Chun, Anyang-si (KR); Ja Ho Koo, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 365 days.

(21) Appl. No.: 12/850,308

(22) Filed: Aug. 4, 2010

(65) Prior Publication Data

US 2011/0200127 A1    Aug. 18, 2011

(30) Foreign Application Priority Data

Feb. 12, 2010    (KR) .................. 10-2010-0013367

(51) Int. Cl.
*H04B 7/02*    (2006.01)
(52) U.S. Cl.
USPC ......................................................... 375/267
(58) Field of Classification Search .................. 375/267
See application file for complete search history.

(56) References Cited

U.S. PATENT DOCUMENTS

| 2010/0208610 | A1* | 8/2010 | Ihm et al. | 370/252 |
| 2011/0090882 | A1* | 4/2011 | Lee et al. | 370/338 |
| 2011/0207494 | A1* | 8/2011 | Zhu et al. | 455/509 |
| 2012/0020319 | A1* | 1/2012 | Song et al. | 370/330 |

FOREIGN PATENT DOCUMENTS

| JP | 2007-043696 | 2/2007 |
| JP | 2009212261 | 9/2009 |
| WO | WO 2009/084905 | 7/2009 |

OTHER PUBLICATIONS

Mazzarese, "Clean-up of DL Multi-BS MIMO section and Table 51 (15.3.14)" IEEEC802.16m-09/2149, Sep. 17, 2009.*
Sarperi, "Editorial Text Changes for DL Multi-BS MIMO section (15.5.1)" IEEEC802.16m-09/2383, Nov. 11, 2009.*
Lee, "Modifications on Interference Mitigation DG Harmonized Text Proposal (C80216m-09/1540r1)" IEEEC802.16m-09/1608, Jul. 12, 2009.*
Chen "Interference Mitigation DG Text Proposal Draft—Multi-BS Bracketed Text : Part2" IEEEC802.16m-09/1544, Jul. 6, 2009.*
Ran "Proposed Clarification on UL Multi-BS MIMO section (15.3.14.4)" IEEEC802.16m09/2163, Sep. 19, 2009.*
Han "Multicell MIMO Text Proposal for PMI Coordination" IEEEC802.16m-09/1625r2, Jul. 12, 2009.*
Chen "Interference Mitigation DG Text Proposal Draft—Multi-BS Bracketed Text : Part1" IEEEC802.16m-09/1542, Jul. 6, 2009.*

* cited by examiner

*Primary Examiner* — Juan A Torres
(74) *Attorney, Agent, or Firm* — McKenna Long & Aldridge LLP

(57) ABSTRACT

The present invention provides feedback control information for the multiple base stations multiple input multiple output (MIMO). The feedback control information according to the present invention includes a target resource unit (TRU) indicating a frequency resource unit to be measured for a feedback. A mobile station according to the present invention transmits feedback information worked on the latest best subbands reported for single base station MIMO.

18 Claims, 4 Drawing Sheets

FEEDBACK METHOD AND APPARATUS FOR MULTIPLE BASE STATIONS IN A WIRELESS COMMUNICATION SYSTEM SUPPORTING SINGLE BASE STATION MIMO COMMUNICATION AND MULTIPLE BASE STATIONS MIMO COMMUNICATION

This application claims the benefit of the Korean Patent Application No. 10-2010-0013367, filed on Feb. 12, 2010, which is hereby incorporated by reference as if fully set forth herein.

BACKGROUND OF THE INVENTION

1. Field of the Invention

The present invention relates to a feedback method and apparatus for multiple base stations multiple input multiple output (MIMO) in a wireless communication system supporting single base station MIMO communication and multiple base stations MIMO communication.

2. Discussion of the Related Art

In the following description, a method of transmitting and receiving feedback information in consideration of a downlink channel status of a user equipment is explained.

In a communication system, a receiving stage enables efficient communication in a manner of transmitting feedback information on a signal received from a transmitting stage. One example of MIMO communication system for the transmitted feedback information is schematically described as follows.

FIG. 1 is a block diagram for transmitting and receiving stages of a general MIMO communication system and information fed back from the receiving stage.

Referring to FIG. 1, a scheduler 101 of a transmitting stage 10 assigns a transmission signal to a proper communication resource using feedback information received from a receiving stage. Subsequently, the transmission signal is transmitted on a channel via an encoding & mapping 102, an MIMO encoding 103 and an orthogonal frequency division multiplexing (OFDM) modulation 104. Meanwhile, the receiving stage 20 receives the transmitted signal and then performs a process reverse to that of the transmitting stage on the received signal. In particular, the received signal undergoes an OFDM modulation 105, an MIMO decoding 106 and a decoding & demapping 107 to obtain transmitted information. Moreover, the receiving stage 200 performs a channel estimation 108 using the OFDM demodulated signal, uses the estimated channel response for the MIMO decoding 106 and for obtaining feedback information 109 to transmit to the transmitting stage. The feedback information is configured as user information 11 and is fed back to the transmitting stage 10, as shown in FIG. 1.

In this case, the information fed back by the receiving stage 20 is classified into OFDM relevant feedback information and MIMO relevant feedback information and is described as follows.

First of all, an OFDM system feeds back channel quality information (hereinafter abbreviated CQI) measured by a user equipment hereinafter abbreviated UE) and channel status information (e.g., SINR (signal to interference and noise ratio), SNR (signal to noise ratio), etc.) to a base station (hereinafter abbreviated BS). Based on the fed-back information, the BS determines resource allocation and MCS (modulation and coding scheme) level.

MIMO-OFDM systems can be classified into an open loop (hereinafter abbreviated OL) type and a closed loop (hereinafter abbreviated CL) type. In OL-MIMO, a UE reports the same feedback information of a conventional OFDM system to a BS. On the contrary, in CL-MIMO, a UE transmits such supplementary information used for downlink transmission as channel information, a weight, a PMI (precoding matrix index) (or, a preferred PMI), a phase for cyclic delay diversity (CDD) scheme and the like to a BS.

The following description is made on the basis of codebook based CL-MIMO. First of all, a UE estimates a PMI most suitable for a current channel status. A CQI has a value differing according to the estimated PMI. Generally, a UE selects a PMI providing a best CQI from PMIs applied to the same channel and then reports a corresponding CQI value to a BS.

Moreover, in an MIMO system, it is able to determine the number of ranks applicable according to a status of channel. For this, a UE is able to inform a BS how many ranks enable most efficient transmission in a current channel status of the UE.

Besides, as mentioned in the foregoing description, the MIMO system can operate in OL or CL. The MIMO system normally selects to use the OL in fast status or the CL in slow status. For this, a UE selects a mode of the OL or CL and then informs a BS of the selected mode.

Meanwhile, the MIMO system is able to enhance sector throughput and cell-edge throughput via multi-BS cooperative signaling. In doing so, if the MIMO system supports multi-BS MIMO operation, how to configure control information for controlling a feedback transmitted by a BS is crucial.

SUMMARY OF THE INVENTION

Accordingly, the present invention is directed to a downlink multi-BS MIMO operation in a wireless mobile communication system that substantially obviates one or more problems due to limitations and disadvantages of the related art.

An object of the present invention is to provide a method of measuring feedback information in case of supporting both a single base station MIMO operation and a multi-BS MIMO operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a feedback method for multiple base stations MIMO (multiple input multiple output) in a wireless communication system supporting a single base station MIMO communication and a multiple base stations MIMO communication according to the present invention includes the steps of transmitting feedback control information for the multiple base stations MIMO to a mobile station and receiving a multiple base stations MIMO feedback message for a multiple base stations MIMO feedback generated based on the feedback control information, wherein the feedback control information includes a target resource unit (TRU) indicating a frequency resource unit to be measured for a feedback.

In another aspect of the present invention, a feedback method for multiple base stations MIMO (multiple input multiple output) in a wireless communication system supporting a single base station MIMO communication and a multiple base stations MIMO communication includes the steps of receiving feedback control information for the multiple base stations MIMO by a mobile station and transmitting a multiple base stations MIMO feedback message for the multiple base stations MIMO feedback generated based on the feedback control information, wherein the feedback control information includes a target resource unit (TRU) indicating a frequency resource unit to be measured for a feedback.

In a further aspect of the present invention, a user equipment in a wireless communication system supporting a single base station MIMO (multiple input multiple output) communication and a multiple base stations MIMO communication includes a receiving unit receiving feedback control information for multiple base stations MIMO, a processing unit generating a multiple base stations MIMO feedback message for a multiple base stations MIMO feedback generated based on the feedback control information, and a transmitting unit transmitting the generated multiple base stations MIMO feedback message, wherein the feedback control information includes a target resource unit (TRU) indicating a frequency resource unit to be measured for a feedback.

Accordingly, the present invention provides the following effect and/or advantage.

First of all, according to a resource allocation notifying method of the present invention, a single base station MIMO feedback and a multiple base station MIMO feedback can be smoothly operated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
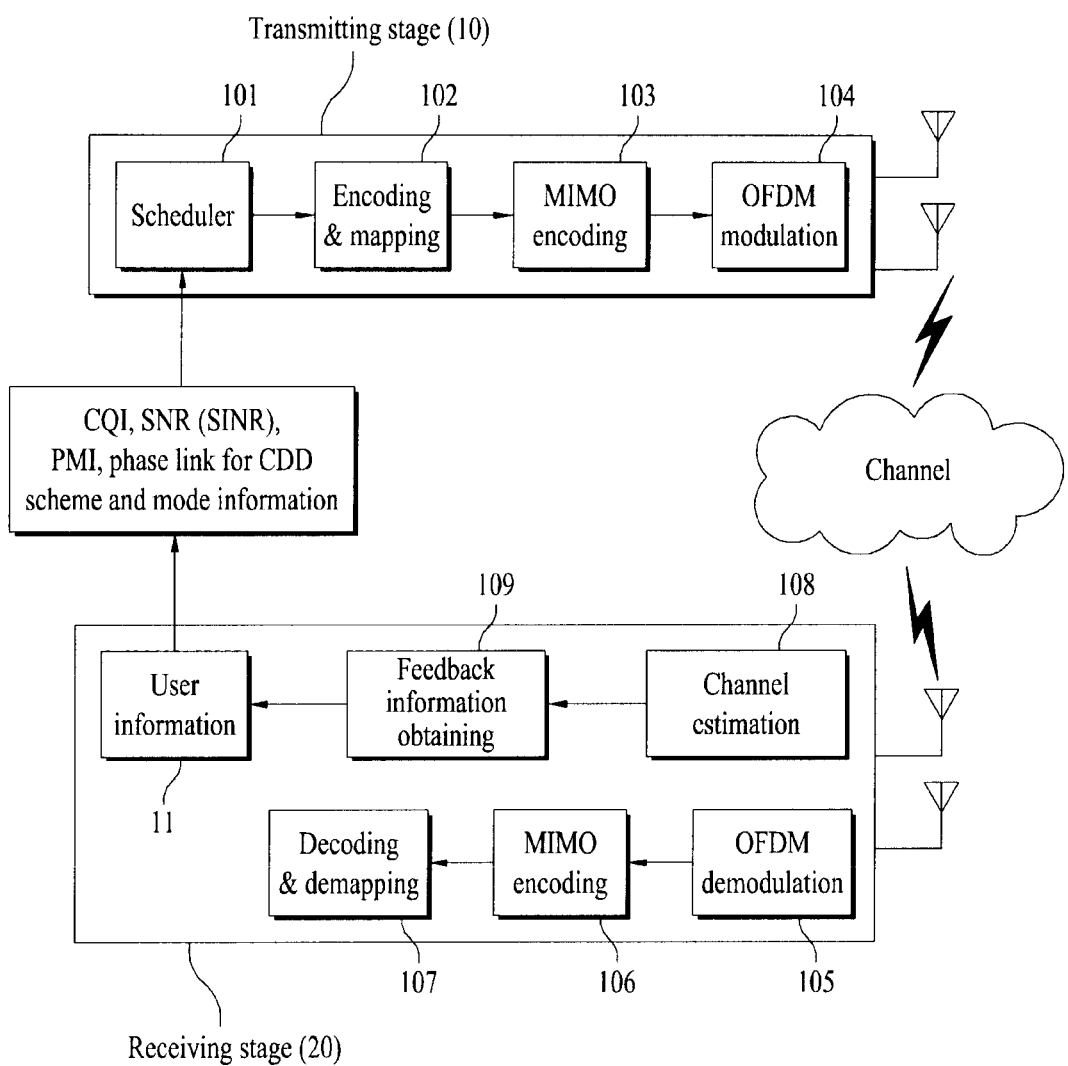
FIG. 1 is a block diagram for transmitting and receiving stages of a general MIMO communication system and information fed back from the receiving stage.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, despite that the following description is made using specific terminologies, the present invention is non-limited by these terminologies or other terminologies indicating the same meanings.

First of all, a whole band used by a base station can be divided into a prescribed number of subbands. The whole band can be divided by the base station in advance in case that FFR (fractional frequency reused) is used. Alternatively, the whole band can be divided for convenience of transmission of a control message. Therefore, the number of subbands generated from dividing a whole band can amount to at least one variously. And, sizes of the subbands can be set equal to or different from each other.

In the following description, explained is a method of measuring feedback information in a system that supports multi-BS MIMO.

First of all, a base station (hereinafter abbreviated BS) makes a request for feedback required for a single BS operation to a user equipment (hereinafter abbreviated UE) via feedback allocation control information (e.g., feedback allocation A-MAP (advanced-MAP) IE (information element), feedback polling A-MAP IE, etc.).

The feedback allocation control information can be configured as Table 1 in the following.

TABLE 1

| Syntax | Size in bits | Description/Notes |
| --- | --- | --- |
| Feedback-Allocation-MAP_IE() { | — | — |
| A-MAP IE Type | [4] | Feedback Allocation A-MAP IE = 0b0010 |
| Channel Index | Variable | Feedback channel index within the UL fast feedback control resource region |
| Short-term Feedback Period (p) | [3] | A feedback is transmitted on the FBCH every $2^p$ frames |
| Long-term Feedback Period (q) | [2] | A long-term feedback is transmitted on the FBCH every $2^q$ short-term feedback opportunity If q = 0b00, long-term feedback is not used. |
| Frame offset | [3] | The AMS starts reporting at the frame of which the number has the same 3 LSB as the specified frame offset. If the current frame is specified, the AMS should start reporting in eight frames |

TABLE 1-continued

| Syntax | Size in bits | Description/Notes |
| --- | --- | --- |
| Allocation Duration(d) | [3] | A FBCH is transmitted on the FBCH channels indexed by Channel Index for $8 \times 2^d$ frames. If d = 0b000, the FBCH is deallocated. If d = 0b111, the AMS should report until the ABS command for the AMS to stop. |
| ACK Allocation Flag | [1] | Indicate if one ACK channel is allocated |
| If (ACK Allocation Flag == 0b1){ | | |
|     HFA | [3] | HARQ feedback channel allocation for Feedback Channel De-allocation confirmation |
| } | | |
| MaxMt | Variable [1-2] | Variable number of bits - depends on number of transmit antenna Nt<br>If Nt = 2 (SU-MIMO and MU-MIMO):<br>0b0: 1<br>0b1: 2<br>If Nt = 4 (SU-MIMO and MU-MIMO):<br>0b00: 1<br>0b01: 2<br>0b10: 3<br>0b11: 4<br>If Nt = 8 (SU-MIMO):<br>0b000: 1<br>0b001: 2<br>0b011: 4<br>0b111: 8<br>If Nt = 8÷ (MU-MIMO) :<br>0b00: 1<br>0b01: 2<br>0b10: 3<br>0b11: 4 |
| MFM | [3] | MIMO Feedback Mode |
| If (MFM = 2, 3, 5, 6) { | | |
|     Feedback Format | [2] | |
| } | | |
| If(MFM=0, 1, 4, 7){ | | |
|     FPI | [2] | Frequency partition indication: ABS indicate AMS to send wideband CQI and STC rate of the frequency partition and reuse factor in the future:<br>0b00: Frequency partition index 0<br>0b01: Frequency partition index 1<br>0b10: Frequency partition index 2<br>0b11: Frequency partition index 3 |
| } | | |
| If (MFM = 0,1 & Long-term Feedback Period != 0b00) { | | |
|     Long term FPI | [2] | Frequency partition indication: ABS indicate AMS to send wideband CQI and STC rate for the second frequency partition using long term feedback:<br>0b00: Frequency partition index 0<br>0b01: Frequency partition index 1<br>0b10: Frequency partition index 2<br>0b11: Frequency partition index 3 |
| } | | |
| If (MFM == 3,4,6,7) { | | CL SU and MU MIMO |
|     CM | [2] | Codebook Feedback Mode and Codebook Coordination Enable<br>0b00: standard with CCE disabled<br>0b01: transformation with CCE disabled<br>0b10: differential with CCE disabled<br>0b11: standard with CCE enabled |
|     CS | [1] | Codebook subset |
| } | | |
| If(MFM=0, 1, 2, 5){ | | |
|     Measurement Method Indication | [1] | 0b0: Use the midamble for CQI measurements<br>0b1: Use pilots in OL region with MaxMt streams for CQI measurements |
| } | | |

TABLE 1-continued

| Syntax | Size in bits | Description/Notes |
|---|---|---|
| Padding | Variable | Padding to reach byte boundary |
| MCRC | [16] | 16 bit CRC masked by Station ID |
| } | — | — |

In Table 1, a channel index allocates a feedback channel for a mobile station to uniquely transmit fast feedback information. By the channel index, a one-to-one relation is established between the channel index and the user equipment.

A short-term feedback period (p) indicates that a short-term feedback is transmitted on FBCH every $2^p$ frames.

A long-term feedback period (q) indicates that a long-term feedback is transmitted on the FBCH every $2^q$ frames. If q=0b00, the long-term feedback is not used.

Regarding an allocation duration (d), a FBCH is transmitted on the FBCH channels indexed by Channel Index for $8 \times 2^d$ frames. If d=0b000, the FBCH is deallocated. If d=0b111, the mobile station should report until the base station command for the AMS to stop.

An MFM indicates an MIMO feedback mode.

A feedback format designates a feedback format index in reporting fast feedback information on the FBCH.

An FPI (frequency partition indicator) indicates a frequency partition for performing a short-term feedback report that is measured by the mobile station.

A long-term FPI indicates a frequency partition for performing a long-term feedback report that is measured by the mobile station.

For instance, the channel index is set to 0, the short-term feedback period (p) is set to 0, the long-term feedback period (q) is set to 2, the allocation duration (d) is set to 7, and the MFM is set to 3.

In case that the MFM is set to 3, the feedback mode can be configured as Table 2. In the following, Table 2 indicates a feedback format for a case that an MIMO feedback mode is 3. The mobile station receives the feedback allocation control information and then transmits the feedback information on an uplink control channel according to the MIMO feedback mode.

TABLE 2

| Feedback Format | FBCH | Number of reports | Report period | Feedback Fields | Size in bits | Description/Notes |
|---|---|---|---|---|---|---|
| 0 (M = 1) | PFBCH | 3 | Short | Subband CQI | N/A | PFBCH encoding Type 0 |
| | | | Short | Subband PMI | N/A | PFBCH encoding Type 2 STC rate = 1 |
| | | | Long | Subband index | N/A | PFBCH encoding Type 1 |
| 1 (M = 2) | SFBCH | 2 | Short | Subband differential CQI Subband PMI | 2 × 2 (3~6) × 2 | Subband index for 5, 10, or 20 MHz |
| | | | Long | Subband index Wideband STC rate Subband avg CQI PFBCH indicator | 4, 7 or 9 1~3 4 1 | |
| 2 (M = 3) | SFBCH | 2 | Short | Subband differential CQI subband PMI | 2 × 3 (3~6) × 3 | |
| | | | Long | Subband index Wideband STC rate Subband avg CQI PFBCH indicator | 5, 8 or 11 1~3 4 1 | |
| 3 (M = 4) | SFBCH | 2 | Short | Subband differential CQI Subband PMI | 2 × 4 (3~4) × 4 | |
| | | | Long | Subband index Wideband STC rate Subband avg CQI | 4, 9 or 14 1~3 4 1 | |

TABLE 2-continued

| Feedback Format | FBCH | Number of reports | Report period | Feedback Fields | Size in bits | Description/Notes |
|---|---|---|---|---|---|---|
| | | | | PFBCH indicator | | |

In Table 2, four feedback formats exist. And, the four feedback formats are set to 0, 1, 2 and 3, respectively. The feedback format 1 is determined to have the number of subbands, which become the targets for the transmission of the feedback information, set to 1 (M=1). The feedback format 2 is determined to have the number of subbands, which become the targets for the transmission of the feedback information, set to 2 (M=2). The feedback format 3 is determined to have the number of subbands, which become the targets for the transmission of the feedback information, set to 3 (M=3). And, the feedback format 4 is determined to have the number of subbands, which become the targets for the transmission of the feedback information, set to 4 (M=4).

In the following description, explained is an example of a case that the feedback format is set to 2.

Figure 2:
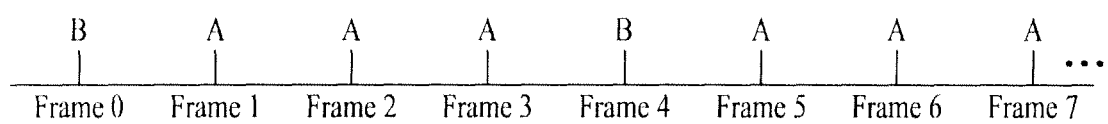
FIG. 2 is a diagram for explaining a single base station MIMO feedback operation according to one embodiment of the present invention.

FIG. 2 is a diagram for explaining a single base station MIMO feedback operation according to one embodiment of the present invention. FIG. 2 illustrates an MIMO feedback operation in case that the channel index is set to 0, that the short-term feedback period (p) is set to 0, that the long-term feedback period (q) is set to 2, that the allocation duration (d) is set to 7, and that the MFM is set to 3. Since the p is set to 0, the short-term feedback is performed every $2^0$ (=1) frame. Since the q is set to 2, the long-term feedback is performed every $2^2$ (=4) frames.

Since the MFM is set to 3, the long-term feedback channel and the short-term feedback channel, as shown in Table 2, are set to SFBCH (secondary fast feedback channel). Since the M is set to 3 (M=3), the short-term feedback is performed in a manner of feeding back indexes of 3 best subbands, a differential CQI, a subband PMI and the like. And, the long-term feedback is performed in a manner of feeding back indexes of 3 best subbands, a wideband STC (space time coding) rate (rank information), a subband average CQI (an average CQI of the 3 best subbands), a PFBCH (primary feedback channel) indicator and the like.

In FIG. 2, 'A' indicates the short-term feedback and 'B' indicates the long-term feedback.

Under this circumstance, the following matters need to be taken into consideration to support a multiple base stations MIMO operation.

First of all, the matter concerning what kind of resource region (frequency, time) shall be measured and reported needs to be taken into consideration. Particularly, according to the present invention, what kind of frequency region shall be measured and reported becomes an issue.

The present invention proposes to measure a prescribed number of best subbands reported to a mobile station from a serving base station. The measurement and report of best subbands reported from a base station is effective for performance enhancement rather than the measurement and report of a resource region except the reported best subbands.

Although it is most preferable that CQI and PMI for the entire subbands, the CQI/PMI for a prescribed number of best subbands is fed back only instead of the CQI/PMI for the entire subbands due to the shortage of capacity of feedback channel. Therefore, it is able to reduce a feedback overhead. This is based on the fact that the best subband fed back by the mobile station will be more allocated to the mobile station than other subbands.

Based on the above contents, feedback allocation control information for activating the multiple base stations (multi-BS) MIMO is configured as Table 3.

TABLE 3

| Syntax | Size in bits | Notes |
|---|---|---|
| A-MAP IE Type { | [4] | Feedback_Polling_IE |
| Allocation Duration (d) | 3 | The allocation is valid for $2^{(d-1)}$ superframes starting from the superframe defined by allocation relevance. If d == 0b000, the pre-scheduled feedback header transmission is released. If d == 0b111, the pre-scheduled feedback header transmission shall be valid until the BS commands to release it. |
| If (d ==0b00){ | | |
| Resource Index | 11 | Confirmation of the resource index for a previously assigned persistent resource that has been deallocated 5 MHz: 0 in first 2 MSB bits + 9 bits for resource index 10 MHz: 11 bits for resource index 20 MHz: 11 bits for resource index Resource index includes location and allocation size |

TABLE 3-continued

| Syntax | Size in bits | Notes |
|---|---|---|
| HFA | 3 | HARQ feedback channel allocation for Feedback Channel De-allocation confirmation |
| } else if (d != 0b00){ | | |
| Dedicated UL allocation | 1 | 0b0: No dedicated UL resource is allocated. BS shall provide UL allocation for the MIMO feedback IE transmission through UL A-MAP IE at each designated transmitting frame defined by this IE. 0b1: Dedicated UL resource is included in this IE |
| If (Dedicated UL allocation ==0b1){ | | |
| $I_{SizeOffset}$ | 5 | Offset used to compute burst size index |
| Resource Index | 11 | 5 MHz: 0 in first 2 MSB bits + 9 bits for resource index 10 MHz: 11 bits for resource index 20 MHz: 11 bits for resource index Resource index includes location and allocation size |
| } | | |
| Period (p) | 3 | Transmit feedback every $4^p$ frame |
| MIMO_feedback_IE_type | 1 | 0b0: feedback for single-BS MIMO operation 0b1: feedback for multi-BS MIMO operation |
| If (MIMO_feedback_IE_type == 0b0){ | | Single-BS MIMO feedback request |
| If (Dedicated UL allocation == 0b1){ | | |
| MEF | 1 | MIMO encoder format 0b0: SFBC 0b1: Vertical encoding with Mt = 2 if Nt = 2 or 4, or Mt = 1 if Nt = 1 Non-adaptive precoding shall be used at the MS. Nt is the number of transmit antennas at the AMS. |
| } | | |
| Transmit_Correlation_Matrix | 1 | 0b0: feedback of the transmit correlation matrix is indicated by CM 0b1: feedback of the quantized BS transmit correlation matrix only Transmit correlation matrix shall be feedback if CM = 0b1 |
| If (Transmit_Correlation_Matrix == 0b0){ | | ABS requests AMS to feedback CQI And CSI for a specific MFM. |
| MaxMt | Variable 1 or 2 | Variable number of bits - depends on number of transmit antenna Nt If Nt = 2 (SU-MIMO and MU-MIMO): 0b0: 1 0b1: 2 If Nt = 4 (SU-MIMO and MU-MIMO): 0b00: 1 0b01: 2 0b10: 3 0b11: 4 If Nt = 8 (SU-MIMO): 0b000: 1 0b001: 2 0b011: 4 0b111: 8 If Nt = 8+ (MU-MIMO): 0b00: 1 0b01: 2 0b10: 3 0b11: 4 |
| MFM | 3 | MIMO Feedback Mode for which the AMS shall feedback CQI and CSI to the ABS |
| If (MFM = 2, 3, 5, 6) { | | Feedback of CQI and CSI for localized resource units |

TABLE 3-continued

| Syntax | Size in bits | Notes |
|---|---|---|
|         Num_best_subbands | 3 | 0b000: report all subbands<br>0b001~0b111: Number of best subbands to report<br>1 < Num_best_subbands ≦ $N_{sub}$ |
|     } | | |
|     If (MFM == 3,4,6,7) { | | CL SU and MU MIMO |
|         CM | [TBD] | [TBD] |
|         CS | 1 | 0b0: report PMI from the base codebook<br>0b1: report PMI from the codebook subset |
|     } | | |
|     If (MFM=0, 1, 2, 5){ | | |
|         Measurement Method Indication | 1 | 0b0: Use the midamble for CQI measurements<br>0b1: Use pilots in OL region with MaxMt streams for CQI measurements |
|     } | | |
|   } | | |
| } | | |
|   Else { | | Multi-BS MIMO feedback request |
|     TRU | 2 | Target RU indicating which RUs or which type of RU to work on for feedback<br>0b00: Latest best subbands reported for single BS MIMO<br>0b01: Whole bandwidth<br>0b10: FFR partition 0<br>0b11: boosted FFR partition |
|     ICT | 2 | 0b00: PMI restriction for single-BS precoding;<br>0b01: PMI recommendation for single-BS precoding;<br>0b10: CL-MD for multi-BS precoding;<br>0b11: Co-MIMO for multi-BS precoding; |
|     CS | 1 | 0b0: report PMI from the base codebook<br>0b1: report PMI from the codebook subset |
|     N_multiBS_reports | 3 | N_multiBS_reports indicates the number of reports. |
|     If (ICT = 0b10 or 0b11) { | | |
|         CPI | 1 | Concatenating PMI Feedback indication;<br>0b0: feedback CPMI for N_multiBS_reports-1 diversity set members;<br>0b1: no feedback CPMI |
|     If (ICT = 0b11) { | | |
|         MaxUser | 2 | Maximum number of users supported in Co-MIMO in the same resource.<br>0b00: 2 users<br>0b01: 3 users<br>0b10: 4 users<br>0b11: reserved |
|     } | | |
|   } | | |
| } | | |
| Reserved | 1 | |
| Padding | variable | Padding to reach byte boundary |
| MCRC | 16 | 16 bit CRC masked by Station ID |

Referring to Table 3, if the allocation duration (d) is set to 0b000, the pre-scheduled feedback header transmission is released. If d==0b111, the pre-scheduled feedback header transmission shall be valid until the base station commands to release it.

The dedicated UL allocation indicates an UL resource allocation. If the dedicated UL allocation is set to 0b0, no dedicated UL resource is allocated. If the dedicated UL allocation is set to 0b1, a dedicated UL resource is included in the feedback allocation control information. The period (p) indicates that a feedback is transmitted every $4^P$ frames. The MIMO feedback resource element type (MIMO_feedback_IE_type) indicates whether it is a single BS MIMO feedback request or a multi-BS MIMO feedback request. If the MIMO feedback resource element type value is set to 0b0, it indicates a single BS MIMO feedback request. If the MIMO feedback resource element type is not set to 0b0, it indicates a multi-BS MIMO feedback request. And, the TRU (target resource unit) indicates a resource unit to work on for feedback in case that a multi-BS MIMO feedback is performed.

If 2 bits are allocated for the TRU and the TRU is set to a prescribed value, a prescribed number of latest best subbands reported for the single-BS MIMO becomes the targets to work on the feedback. The multi-BS reports number (N_multi_BS_reports) indicates the number of reports. The prescribed value can be set to 0b00 as shown in Table 3.

Moreover, if 2 bits are allocated for an ICT (interference coordination type) in Table 3 and a value of the ICT is set to 0b00, the mobile station finds a PMI acting as strongest interference with a neighbor cell from the frequency resource unit indicated by the TRU. If the ICT is set to 0b01, the mobile station finds a PMI acting as weakest interference with a neighbor cell from the frequency resource unit indicated by the TRU. Meanwhile, if the ICT value is set to 0b10, the ICT indicates closed loop-Marco diversity (CL-MD) for multi-BS precoding. If the ICT value is set to 0b11, the ICT indicates collaborative MIMO (Co-MIMO).

As the ICT value is set to 0b01, if the CL-MD becomes activated, a single mobile station receives a service in a manner of being collaborative with a plurality of collaborative base stations. As the ICT value is set to 0b11, if the Co-MIMO becomes activated, a plurality of mobile stations receive services in a manner of being collaborative with a plurality of collaborative base stations through MU-MIMO (multi-user-MIMO) scheduling and precoding.

For instance, in Table 3, the allocation duration is set to 7, the dedicated uplink allocation is set to 1, the period (p) is set to 2, the MIMO feedback resource element type (MIMO_feedback_IE_type) is set to 1, the TRU (target resource unit) is set to 0, and the number of multi-BS reports (N_multi_BS_reports) is set to 4.

In this case, the MIMO feedback message format for the multi-BS MIMO feedback can be configured as Table 4 in the following.

TABLE 4

| Name | Length (bit) | Description |
| --- | --- | --- |
| AAI_MultiBS_MIMO_FBK_Message_Format { | | |
| Management Message Type = xx | | |
| if (ICT ==0b10 or 0b11){ | | Co-MIMO or CL-MD |
|     CQI | 4 | |
| } | | |
| for (i = 1; i <= N_multiBS_reports; i++) { | | |
|     Temp_BSID | [TBD] | Diversity set member ID |
|     PMI | 3 to 6 | PMI from the rank-1 base codebook or base codebook subset |
|     If (ICT==0b00 or 0b01) { | | |
|         Additional measurement metric | [TBD] | [TBD] |
|         PMI_subset_size | 1 | Indication whether 1 PMI or a PMI set is feedback 0b0: 1 PMI 0b1: multiple PMIs |
|         If (PMI_subset_size == 0b1){ | | |
|             PMI_coordination_subset | 1 | Set of PMIs from the rank-1 base codebook or base codebook subset 0b0: correlation level n1 (cf. Table 54) 0b1: correlation level n2 (cf. Table 54) |
|         } | | |
|     } | | |
|     If (ICT==0b10 or 0b11 ) { | | ICT is defined in Feedback Polling A-MAP IE |
|         If (CPI == 0b0){ | | CPI is defined in Feedback Polling A-MAP IE |
|             CPMI | [TBD] | Concatenating PMI for neighboring cells. |
|         } | | |
|     } | | |
| } | | |
| } | | |

Using the message format shown in Table 4, a mobile station calculates and reports a temporary base station ID, an additional measurement metric (e.g., SINR gain, etc.) from an interference cell for a region of a best subband reported for a single base station MIMO, a PMI and a PMI subset size on an uplink data channel indicated by a resource index every 16 (=$4^2$) frames.

Figure 3:
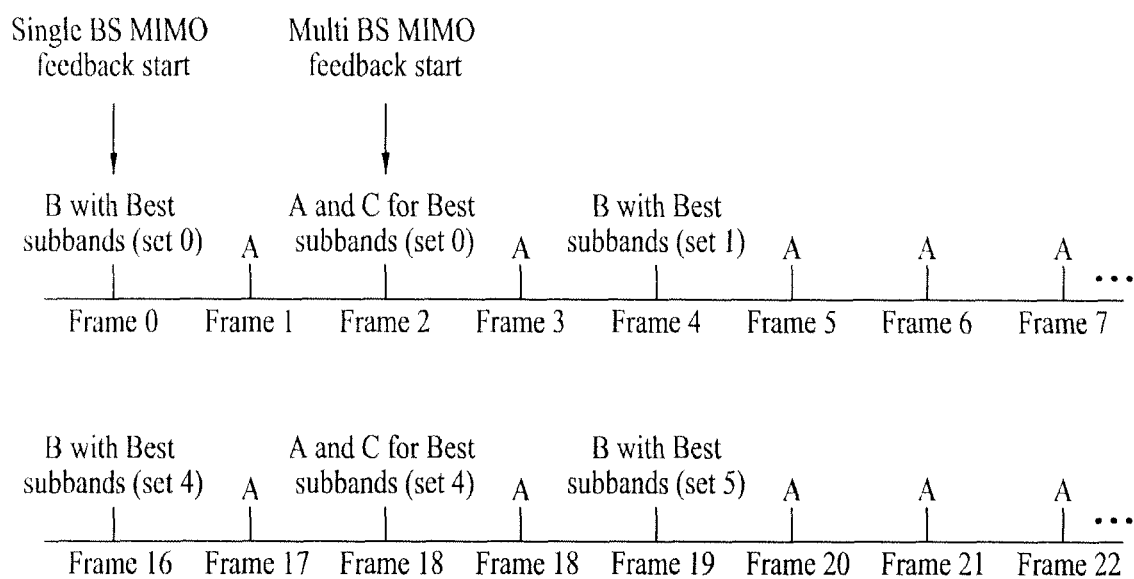
FIG. 3 is a diagram for explaining a feedback operation in case of supporting a multiple base station MIMO according to one embodiment of the present invention.

FIG. 3 is a diagram for explaining a feedback operation in case of supporting a multiple base station MIMO according to one embodiment of the present invention. In FIG. 3, 'C' indicates a multi-BS feedback. FIG. 3 shows a state that a multi-BS MIMO feedback is performed on the basis of the state shown in FIG. 2. In FIG. 3, each set is represented as binding feedbacks having the same best subband together.

Yet, in case of supporting a multi-BS MIMO, a feedback operation is non-limited by the operation shown in FIG. 3. Alternatively, feedback information can be transmitted in the same frame in a manner that a long-term feedback period of a single BS is set equal to a period of a multi-BS feedback or that a long-term feedback period of a single BS is set to a multiple of a period of a multi-BS feedback.

Figure 4:
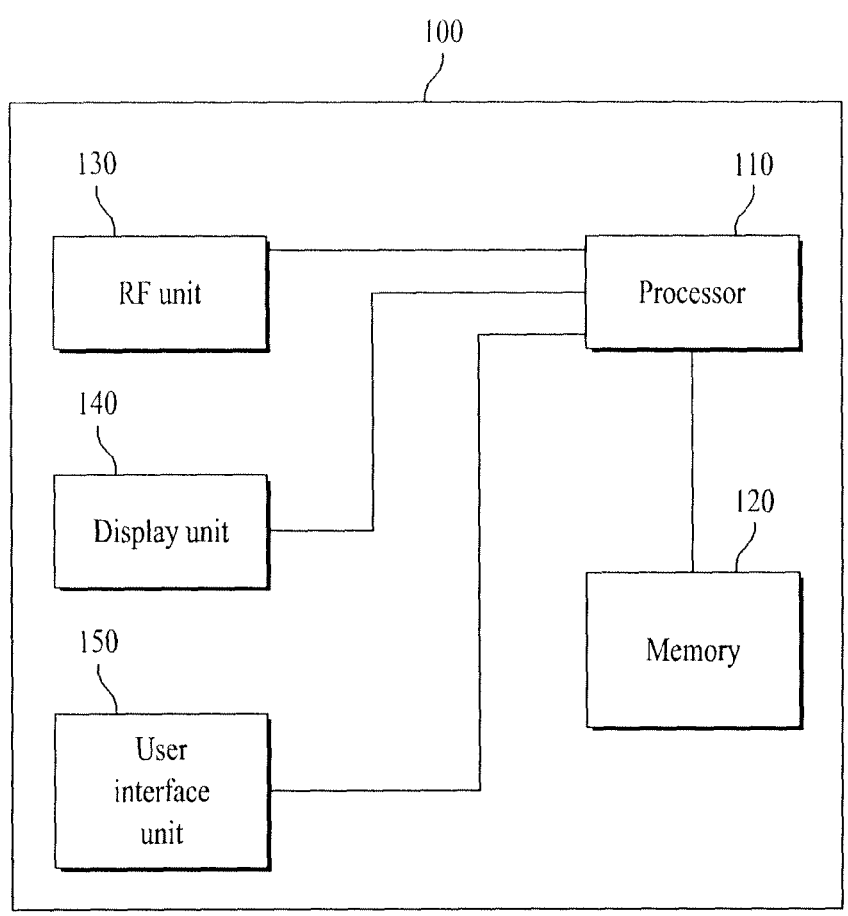
FIG. 4 is a block diagram for components of a user equipment according to one embodiment of the present invention.

FIG. 4 is a block diagram for a configuration of a device applicable to a user equipment or a base station to implement the above mentioned method of the present invention, in which the device can include a user equipment or a base station.

Referring to FIG. 4, a device 100 includes a processing unit 110, a memory unit 120, an RF (radio frequency) unit 130, a display unit 140 and a user interface unit 150. A layer of a physical interface protocol is performed by the processing unit 110. The processing unit 110 provides a control plane and a user plane. A function of each layer can be performed by the processing unit 110. The memory unit 120 is electrically connected to the processing unit 110. And, an operating system, applications and general files are stored in the memory unit 120. If the device 100 is a user equipment, the display unit 140 is able to display various kinds of information. And, the display unit 140 can be implemented using such a well-known display as an LCD (liquid crystal display), an OLED (organic light emitting diode) display and the like. The user interface unit 150 can be configured by being combined with such a well-known user interface as a keypad, a touch-screen and the like. And, the RF unit 130 is electrically connected to the processing unit 110. The RF unit 130 transmits or receives a radio signal.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

And, according to the present invention, 'user equipment' corresponds to a mobile station (MS). And, the mobile station (MS) can be replaced by such a terminology as a subscriber station (SS), a mobile subscriber station (MSS), a mobile terminal and the like.

Moreover, a user equipment of the present invention can include one of a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

And, the present invention is applicable to systems that support the IEEE standard 802.16m system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A feedback method for multiple base stations MIMO (multiple input multiple output) in a wireless communication system supporting a single base station MIMO communication and a multiple base stations MIMO communication, comprising:
    transmitting feedback control information for the multiple base stations MIMO to a mobile station; and
    receiving a multiple base stations MIMO feedback message for a multiple base stations MIMO feedback generated based on the feedback control information,
    wherein the feedback control information includes a target resource unit (TRU) indicating a frequency resource unit to be measured for feedback, and
    wherein the multiple base stations MIMO feedback message includes feedback information that is based on measurements of the latest best subbands reported for a single base station MIMO operation when the TRU is set to a prescribed value.

2. The feedback method of claim 1, wherein the prescribed value is 0.

3. The feedback method of claim 1, wherein the feedback control information includes interference coordination information and wherein the interference coordination information indicates to select a precoding matrix index (PMI) acting as strongest interference with a neighbor cell.

4. The feedback method of claim 1, wherein the feedback control information includes interference coordination information and wherein the interference coordination information indicates to select a precoding matrix index (PMI) acting as weakest interference with a neighbor cell.

5. The feedback method of claim 1, wherein the feedback control information includes interference coordination information and wherein the interference coordination information indicates a closed loop-macro diversity (CL-MD) mode for multiple base stations precoding.

6. The feedback method of claim 1, wherein the feedback control information includes interference coordination information and wherein the interference coordination information indicates a collaborative-MIMO mode for multiple base stations precoding.

7. A feedback method by a mobile station for multiple base stations MIMO (multiple input multiple output) in a wireless communication system supporting a single base station MIMO communication and a multiple base stations MIMO communication, comprising the steps of:
receiving feedback control information for the multiple base stations MIMO; and
transmitting a multiple base stations MIMO feedback message for a multiple base stations MIMO feedback generated based on the feedback control information,
wherein the feedback control information includes a target resource unit (TRU) indicating a frequency resource unit to be measured for feedback, and
wherein multiple base stations MIMO feedback message includes feedback information that is based on measurements of the latest best subbands reported for a single base station MIMO operation when the TRU is set to a prescribed value.

8. The feedback method of claim 7, wherein the prescribed value is 0.

9. The feedback method of claim 7, wherein the feedback control information includes interference coordination information and wherein the interference coordination information indicates to select a precoding matrix index (PMI) acting as strongest interference with a neighbor cell.

10. The feedback method of claim 7, wherein the feedback control information includes interference coordination information and wherein the interference coordination information indicates to select a precoding matrix index (PMI) acting as weakest interference with a neighbor cell.

11. The feedback method of claim 7, wherein the feedback control information includes interference coordination information and wherein the interference coordination information indicates a closed loop-macro diversity (CL-MD) mode for multiple base stations precoding.

12. The feedback method of claim 7, wherein the feedback control information includes interference coordination information and wherein the interference coordination information indicates a collaborative-MIMO mode for multiple base stations precoding.

13. A user equipment in a wireless communication system supporting a single base station MIMO (multiple input multiple output) communication and a multiple base stations MIMO communication, comprising:
a receiving unit receiving feedback control information for multiple base stations MIMO;
a processing unit generating a multiple base stations MIMO feedback message for a multiple base stations MIMO feedback generated based on the feedback control information; and
a transmitting unit transmitting the generated multiple base stations MIMO feedback message,
wherein the feedback control information includes a target resource unit (TRU) indicating a frequency resource unit to be measured for feedback, and
wherein the multiple base stations MIMO feedback message includes feedback information that is based on measurements of the latest best subbands reported for a single base station MIMO operation when the TRU is set to a prescribed value.

14. The user equipment of claim 13, wherein the prescribed value is 0.

15. The user equipment of claim 13, wherein the feedback control information includes interference coordination information and wherein the interference coordination information indicates to select a precoding matrix index (PMI) acting as strongest interference with a neighbor cell.

16. The user equipment of claim 13, wherein the feedback control information includes interference coordination information and wherein the interference coordination information indicates to select a precoding matrix index (PMI) acting as weakest interference with a neighbor cell.

17. The user equipment of claim 13, wherein the feedback control information includes interference coordination information and wherein the interference coordination information indicates a closed loop-macro diversity (CL-MD) mode for multiple base stations precoding.

18. The user equipment of claim 13, wherein the feedback control information includes interference coordination information and wherein the interference coordination information indicates a collaborative-MIMO mode for multiple base stations precoding.

* * * * *